(12) United States Patent
Olsen

(10) Patent No.: US 8,434,330 B2
(45) Date of Patent: May 7, 2013

(54) TECHNIQUES FOR MANUFACTURING BIREFRINGENT OPTICAL FIBER

(75) Inventor: Jorgen Ostgaard Olsen, Copenhagen (DK)

(73) Assignee: OFS Fitel, LLC, Norcross, GA (US)

( * ) Notice: Subject to any disclaimer, the term of this patent is extended or adjusted under 35 U.S.C. 154(b) by 148 days.

(21) Appl. No.: 12/893,991

(22) Filed: Sep. 29, 2010

(65) Prior Publication Data

US 2011/0097048 A1    Apr. 28, 2011

Related U.S. Application Data

(60) Provisional application No. 61/254,123, filed on Oct. 22, 2009.

(51) Int. Cl.
*C03B 37/025* (2006.01)
*G02B 6/028* (2006.01)

(52) U.S. Cl.
USPC .............. 65/419; 65/412; 65/385; 428/542.8

(58) Field of Classification Search .................. None
See application file for complete search history.

(56) References Cited

U.S. PATENT DOCUMENTS

| | | | |
|---|---|---|---|
| 4,515,436 A | 5/1985 | Howard et al. | |
| 4,978,377 A | 12/1990 | Brehm et al. | |
| 5,353,365 A * | 10/1994 | Dumas et al. | 385/102 |
| 5,949,941 A | 9/1999 | DiGiovanni | |
| 6,483,973 B1 | 11/2002 | Mazzarese et al. | |
| 6,744,939 B2 | 6/2004 | Lampert et al. | |
| 7,412,142 B2 | 8/2008 | Chen et al. | |
| 2002/0108403 A1 * | 8/2002 | Dong et al. | 65/384 |
| 2005/0204780 A1 * | 9/2005 | Moridaira et al. | 65/407 |
| 2007/0177846 A1 | 8/2007 | Chen et al. | |

FOREIGN PATENT DOCUMENTS

| | | | |
|---|---|---|---|
| JP | 2003342032 A | * | 12/2003 |
| JP | 2009149470 A | * | 7/2009 |
| RU | 2252197 C1 | * | 5/2005 |

OTHER PUBLICATIONS

Machine Translation of JP2003-342032, Apr. 2012.*

* cited by examiner

*Primary Examiner* — Christina Johnson
*Assistant Examiner* — Lisa Herring
(74) *Attorney, Agent, or Firm* — Jacobs & Kim LLP

(57) ABSTRACT

In a technique for fabricating a birefringent optical fiber, a preform rod is fabricated having a longitudinal axis, an outer peripheral surface, and a selected refractive index variation. At least one longitudinal groove is cut into the preform rod through its outer peripheral surface, wherein the at least one longitudinal groove has a cross sectional area equal to that of a respective birefringence-inducing stress element to be loaded into the groove, such that when the stress element is loaded into the groove, a portion of the stress element protrudes outside of the circumference of the preform. A respective birefringence-inducing stress element is loaded into the at least one longitudinal groove. A preform assembly is created by positioning the loaded preform rod within an overcladding tube. The preform assembly is drawn into optical fiber.

15 Claims, 6 Drawing Sheets

TECHNIQUES FOR MANUFACTURING BIREFRINGENT OPTICAL FIBER

CROSS REFERENCE TO RELATED APPLICATION

The present application claims the priority benefit of U.S. Provisional Patent Application Ser. No. 61/254,123, filed on Oct. 22, 2009, which is owned by the assignee of the present application, and which is incorporated herein by reference in its entirety.

BACKGROUND OF THE INVENTION

1. Field of the Invention

The present invention relates generally to optical fiber devices and methods, and in particular to improved techniques for manufacturing birefringent optical fiber.

2. Background Art

In the field of fiber optics, a polarization-maintaining fiber (PM fiber) is a type of optical fiber in which the polarization of linearly-polarized light waves launched into the fiber is maintained during propagation. One common type of PM fiber is the PANDA ("Polarization-maintaining AND Absorption-reducing") design, in which a high degree of fiber birefringence is created by adding stress rods to the cladding region of a fiber preform. PANDA-style fibers were originally developed for the telecommunications industry. Over the years, the use of these fibers has expanded to a number of other applications, including fiber optic gyros, fiber optic sensors, and high-power fiber lasers.

Currently, PANDA-style fibers are manufactured using a costly, painstaking technique. A preform rod is fabricated. A skilled operator uses special equipment to drill precisely positioned first and second holes down the length of the rod, parallel to the rod axis. Respective first and second stress rods are fitted into the first and second holes. The stress rods are chemically doped to have a different degree of thermal expansion than that of the material used to fabricate the preform rod. When a fiber is drawn from a preform incorporating the preform rod, the stress rods introduce mechanical stress with a well-defined orientation.

The described technique suffers from a number of disadvantages. First, the hole-drilling operation is difficult to perform and is typically done by specialized glass working companies. Second, the amount of fiber yielded by a preform depends upon its length. In the case of a PANDA-style fiber, the length of the preform is limited by the maximum drilling depth of the precision drilling rig used to drill the holes into the preform rod.

SUMMARY OF THE INVENTION

These and other issues of the prior art are addressed by the presently described technique for fabricating a birefringent optical fiber. A preform rod is fabricated having a longitudinal axis, an outer peripheral surface, and a selected refractive index variation. At least one longitudinal groove is cut into the preform rod through its outer peripheral surface. A respective birefringence-inducing stress element is loaded into the at least one longitudinal groove. A preform assembly is created by positioning the loaded preform rod within an overcladding tube. The preform assembly is drawn into optical fiber.

DETAILED DESCRIPTION

Figure 1:
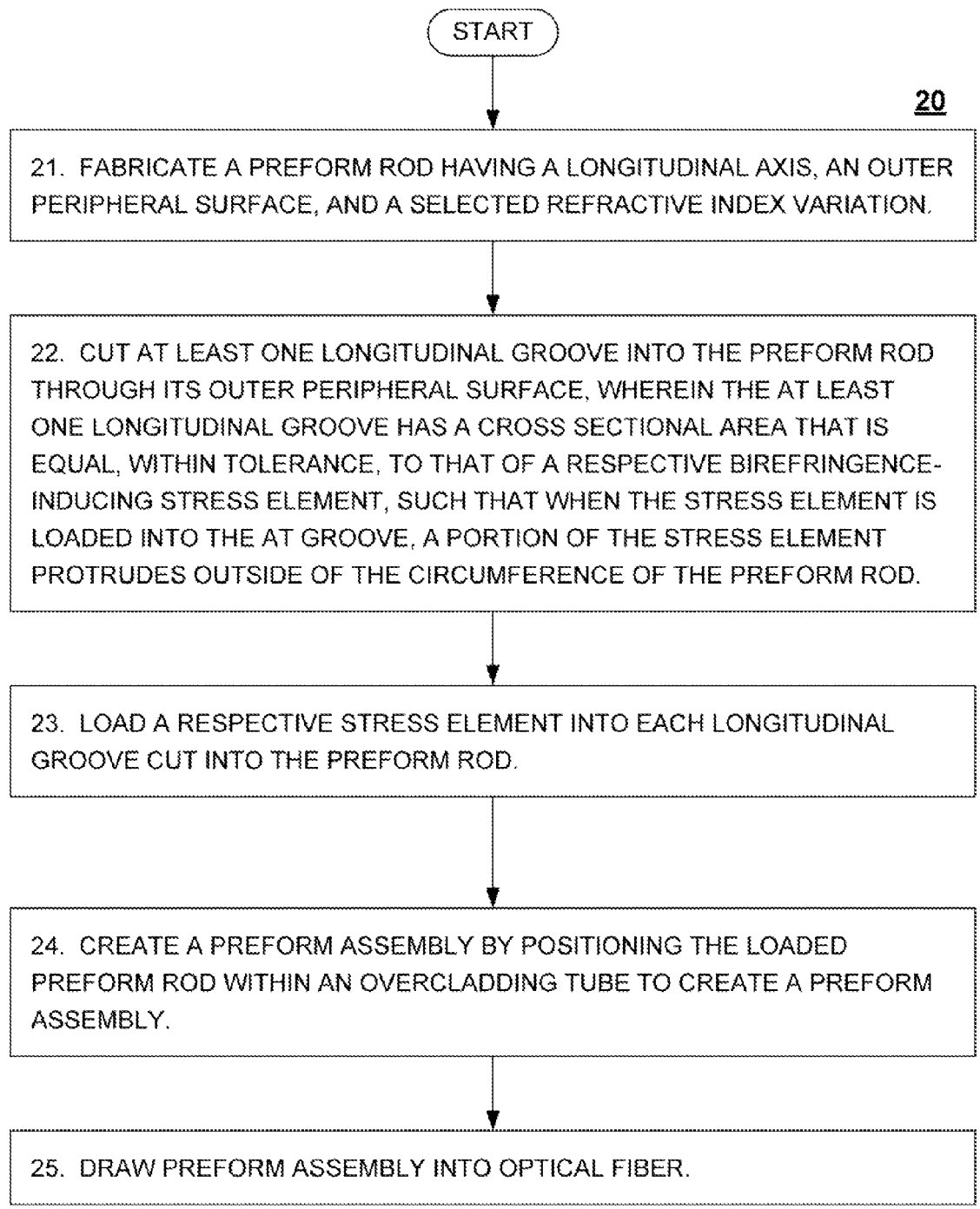
FIG. 1 is a flowchart of an exemplary technique for fabricating a birefringent optical fiber.

FIG. 1 is a flowchart illustrating an exemplary technique 20 for fabricating a birefringent optical fiber. The depicted technique includes the following steps:

Step 21: Fabricate a preform rod having a longitudinal axis, an outer peripheral surface, and a selected refractive index variation.

Step 22: Cut at least one longitudinal groove into the preform rod through its outer peripheral surface, wherein the at least one longitudinal groove has a cross sectional area equal to that of a respective birefringence-inducing stress element to be loaded into the groove, such that when the stress element is loaded into the groove, a portion of the stress element protrudes outside of the circumference of the preform.

Step 23: Load a birefringence-inducing stress element into the at least one longitudinal groove cut into the preform rod.

Step 24: Create a preform assembly by positioning the loaded preform rod within an overcladding tube.

Step 25: Draw the preform assembly into optical fiber.

The above steps are illustrated in FIGS. 2-10 described in detail below with respect to an exemplary preform assembly 100, comprising preform rod 40, stress elements 70 and 80, and overcladding tube 90. In the exemplary preform assembly 100, substantially identical first and second cylindrical stress elements 70 and 80 are symmetrically positioned at corresponding first and second sides of the core region 46 of the preform rod 40. It will be appreciated that the presently described techniques are applicable in other contexts, in which for example different numbers, shapes, and types of birefringence-inducing stress elements can be placed in different locations and configurations in the preform.

As used herein, the term "birefringence-inducing stress element" refers to a component in a fiber preform that, in conjunction with other preform components, creates a selected stress pattern in an optical fiber drawn from the preform under suitable draw conditions. The selected stress pattern has optical properties creating a high degree of birefringence in the drawn fiber.

Step 21 calls for fabricating a preform rod having a longitudinal axis, an outer peripheral surface, and a selected refractive index variation.

Figure 2:
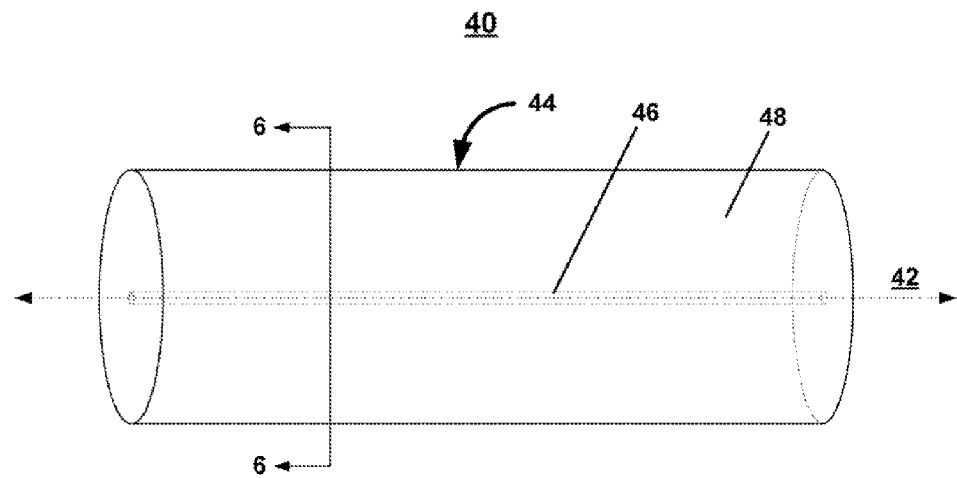
FIG. 2 shows an isometric view of a preform rod in a practice of the exemplary technique.
Figure 6:
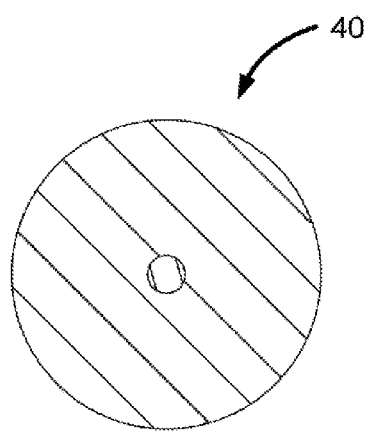
FIG. 6 shows a cross section of the preform rod shown in FIG. 2.

FIGS. 2 and 6 show, respectively, isometric and cross section views, not drawn to scale, of an exemplary preform rod 40 suitable for use in conjunction with the described technique. In this example, the preform rod 40 is substantially cylindrical, with a longitudinal axis 42 and an outer peripheral surface 44. Preform rod 40 is fabricated using a suitable technique, such as a modified chemical vapor deposition (MCVD) technique, or the like.

In the present described example, preform rod 40 is doped to create a stepped refractive index profile, and includes a core region 46 and a cladding region 48 surrounding the core region 46. The core region 46 extends along longitudinal axis 42. Cladding region 48 can include more than one cladding layer. The outer boundary of cladding region 48 forms the outer peripheral surface 44 of the preform rod 40.

It will be appreciated that the presently described technique can be practiced using other types of preform rods, including preform rods fabricated using other techniques, as well as preform rods having other shapes and other types of refractive index variation.

Step 22 calls for cutting at least one longitudinal groove into the preform rod through its outer peripheral surface, wherein the at least one longitudinal groove has a cross sectional area equal to that of a respective birefringence-inducing stress element to be loaded into the groove, such that when the stress element is loaded into the groove, a portion of the stress element protrudes outside of the circumference of the preform.

If the preform rod is slightly bowed, i.e., by a few tenths of a millimeter per meter of preform rod, special care is taken during the grinding operation. The preform rod is mounted into a position with respect to the grinder such that the bow of the rod lies in a plane parallel to the grinder surface, i.e., perpendicular to the plane of the grinding wheel. In this way it is assured that the distance from the bottom of each groove to the outer circumference of the preform core region is uniform along the length of the preform rod. When each stress element is pushed into the bottom of its respective groove by the pressure from the overcladding tube during the drawing process, the distance between each stress element and the preform core region will be the same over the length of the preform rod, thereby assuring a uniform birefringence over the whole length of the drawn fiber.

Figure 3:
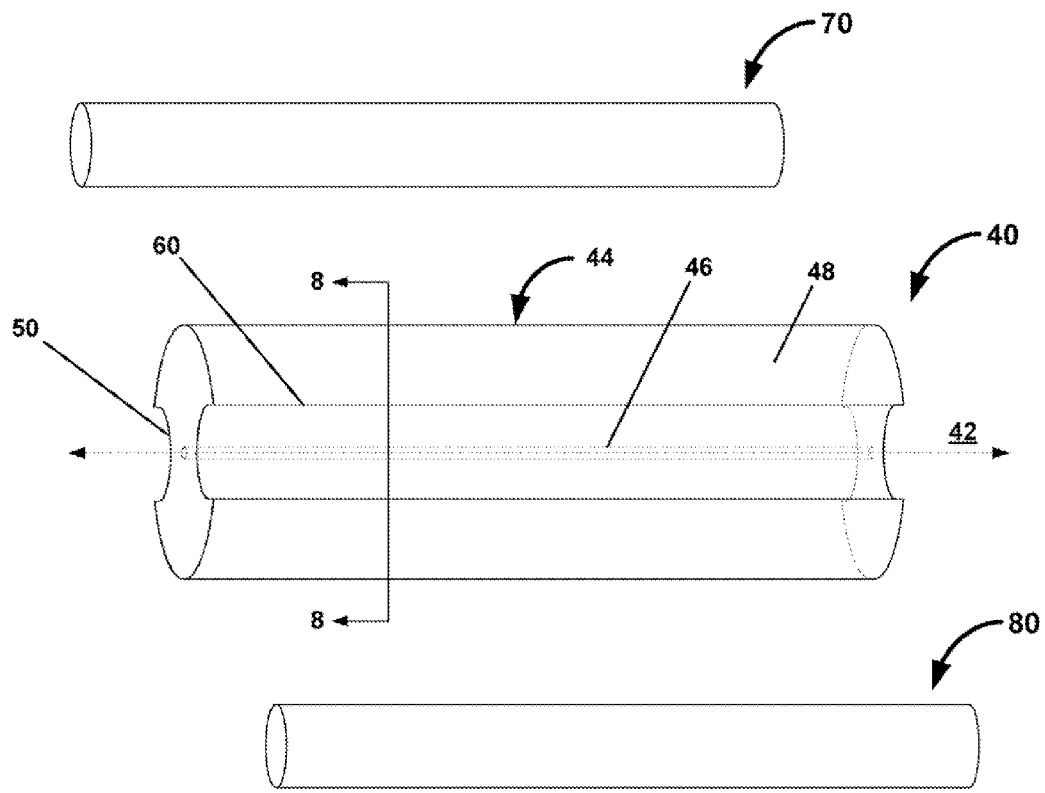
FIG. 3 shows an exploded view of a preform rod and stress elements in a practice of the exemplary technique.
Figure 7:
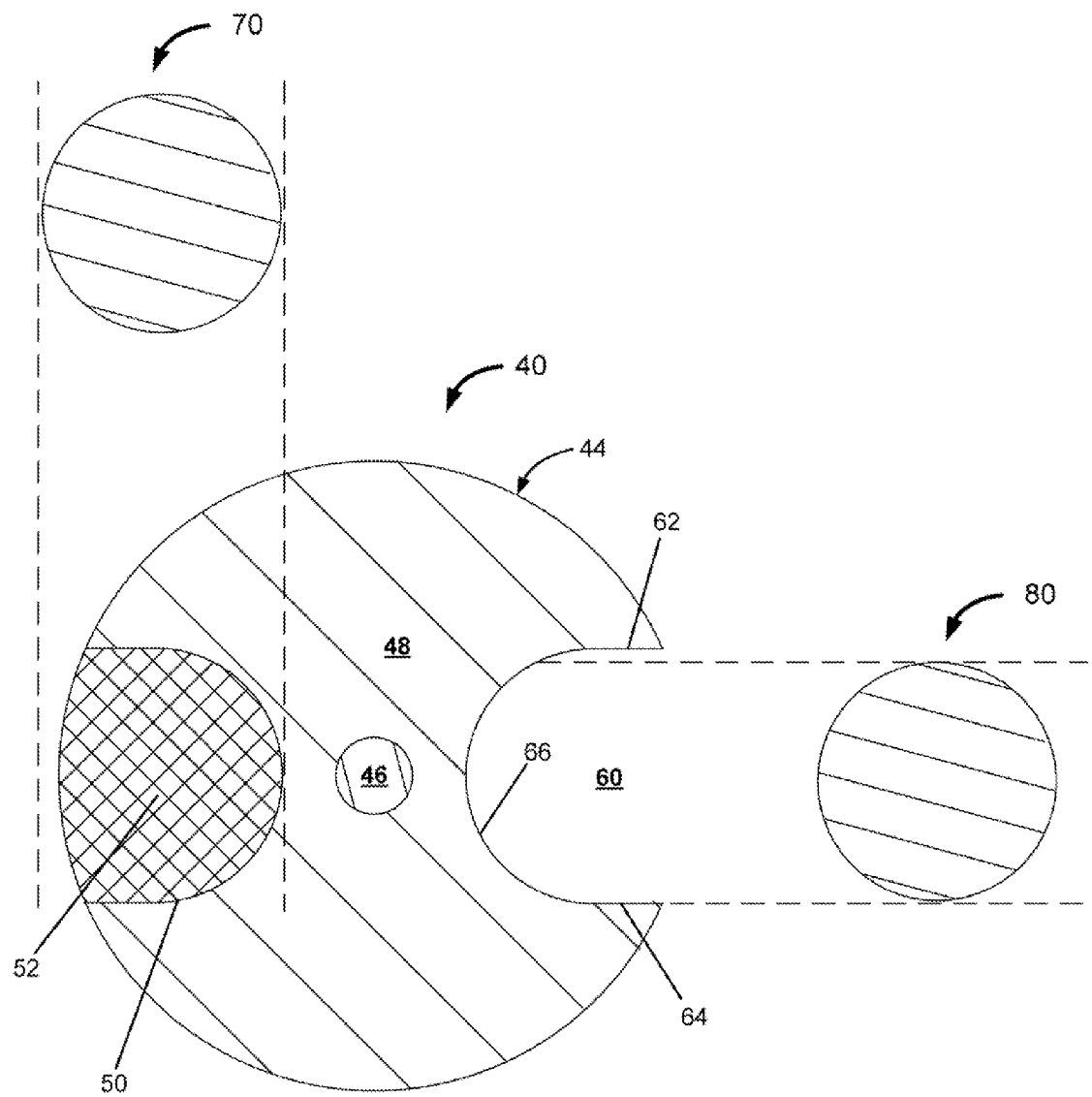
FIG. 7 shows a cross section of the preform rod and stress elements shown in FIG. 3.

FIGS. 3 and 7 show, respectively, isometric and cross section views of exemplary preform rod 40, into which there have been cut first and second longitudinal grooves 50 and 60. Longitudinal grooves 50 and 60 correspond to respective stress elements 70 and 80 to be loaded into the preform rod 40. In the present example, stress elements 70 and 80 are cylindrical in shape and are substantially identical to each other. It will be appreciated the described technique is applicable to other numbers of stress elements, and stress elements having different shapes.

Longitudinal grooves 50 and 60 extend down the length of the preform rod 40, and are aligned with longitudinal axis 46, i.e., parallel to the core region 42.

As shown in FIGS. 3 and 7, the longitudinal grooves 50 and 60 are cut into the preform rod 40 through its outer peripheral surface 44 to a selected depth. Longitudinal grooves 50 and 60 are shaped and dimensioned to closely receive a respective birefringence-inducing stress element and hold it in a birefringence-inducing configuration relative to the other preform rod components. As mentioned above, the longitudinal grooves 50 and 60 have respective cross-sections areas that are substantially equal to those of respective stress elements 70 and 80. This is illustrated in FIG. 7, with respect to longitudinal groove 50, longitudinal groove cross-section area 52, and respective stress element 70.

In the present example, respective stress elements 70 and 80 to be loaded into longitudinal grooves 50 and 60 have a substantially cylindrical shape. Thus, in order for the respective stress elements to fit closely within its respective grooves, the first and second longitudinal grooves 50 and 60 have substantially U-shaped profiles. As illustrated in FIG. 7 with respect to longitudinal groove 60, the U-shaped profile includes first and second substantially parallel legs 62 and 64 and an arcuate bend 66 having a radius that is substantially equal to the radius of respective stress element 80.

It is noted that the presently described techniques are adaptable for use with birefringence-inducing stress elements and or grooves having different shapes.

In order to promote homogeneity and uniformity in the drawn fiber, longitudinal grooves 50 and 60 have respective cross-sectional areas that are substantially equal to that of its respective stress element 70 and 80. Because the grooves 50 and 60 each have a U-shaped profile and the stress elements 70 and 80 each have a circular profile, the described equality between their respective cross-sectional areas means that when each stress element is seated within its respective groove, a portion of the stress element protrudes outside of the circumference of the preform rod.

As shown in FIG. 7, longitudinal grooves 50 and 60 have respective depths that are slightly less that the heights of their respective stress elements 70 and 80 and respective widths that are slightly greater than the widths of their respective stress elements 70 and 80. In the present example, because each of first and second stress elements 70 and 80 has a substantially circular profile, first and second stress elements 70 and 80 have heights and widths equal to their respective diameters.

Step 23 calls for the loading of a respective birefringence-inducing stress element into the at least one longitudinal groove cut into the preform rod.

Figure 4:
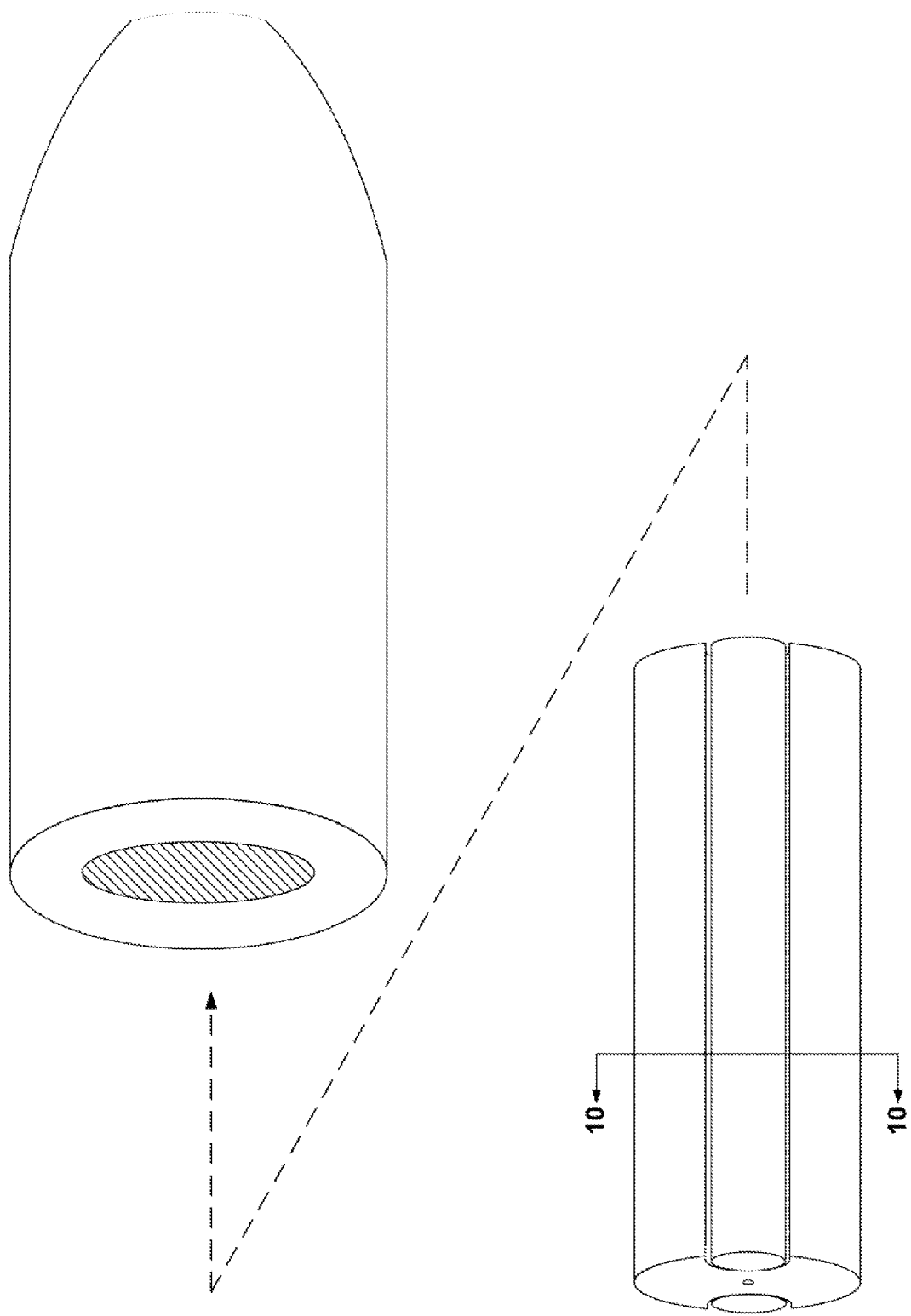
FIG. 4 shows an exploded view of a loaded preform rod and overcladding tube in a practice of the exemplary technique.
Figure 8:
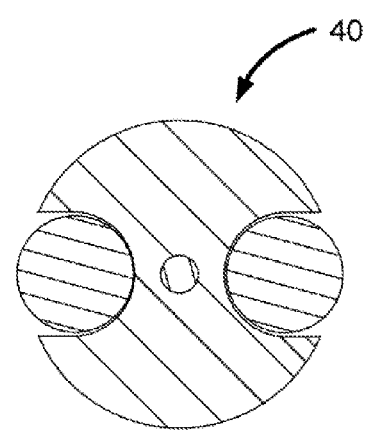
FIG. 8 shows a cross section of the loaded preform rod shown in FIG. 4.

FIGS. 4 and 8 show, respectively, isometric and end views of preform rod 40 with respective first and second stress elements 70 and 80 loaded into first and second longitudinal grooves 50 and 60. Because the respective diameters of the first and second stress elements 70 and 80 are slightly greater that the respective depths of the first and second longitudinal grooves 50 and 60, the first and second stress elements 70 and 80 protrude slightly outside of outer peripheral surface 44. In addition, as mentioned above, the respective widths of the first and second longitudinal grooves 50 and 60 are slightly greater than the respective diameters of first and second stress elements 70 and 80. The respective cross-sectional areas of the first and second longitudinal grooves 50 and 60 are substantially equal to that of respective first and second stress elements 70 and 80.

Step 24 calls for the creation of a preform assembly by positioning the loaded preform rod within an overcladding tube.

Figure 5:
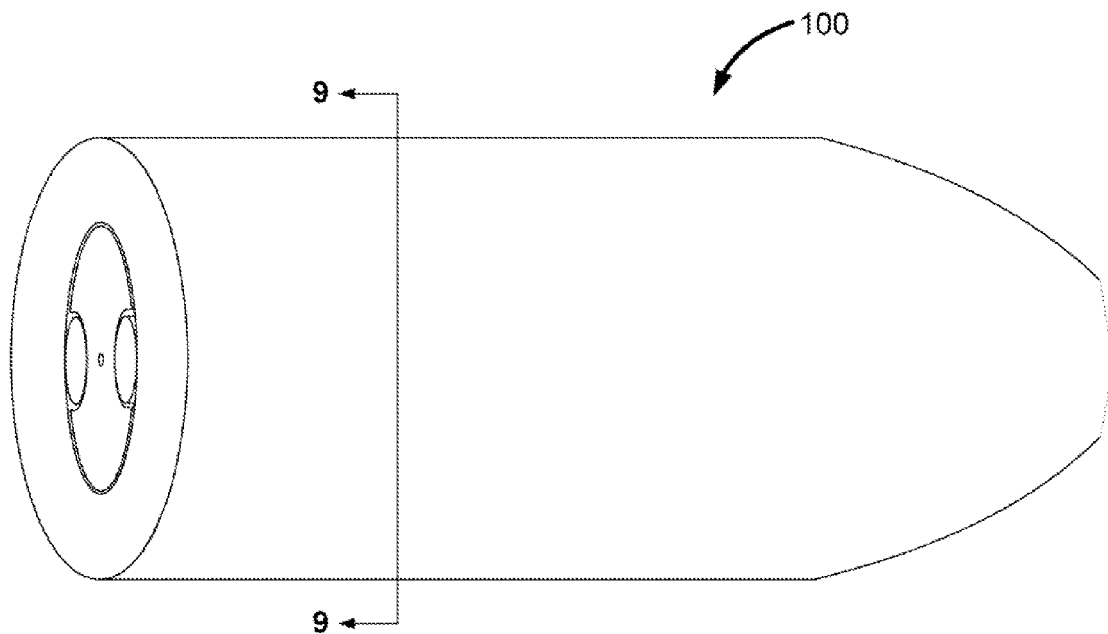
FIG. 5 shows an isometric view of a preform assembly in a practice of the exemplary technique.
Figure 9:
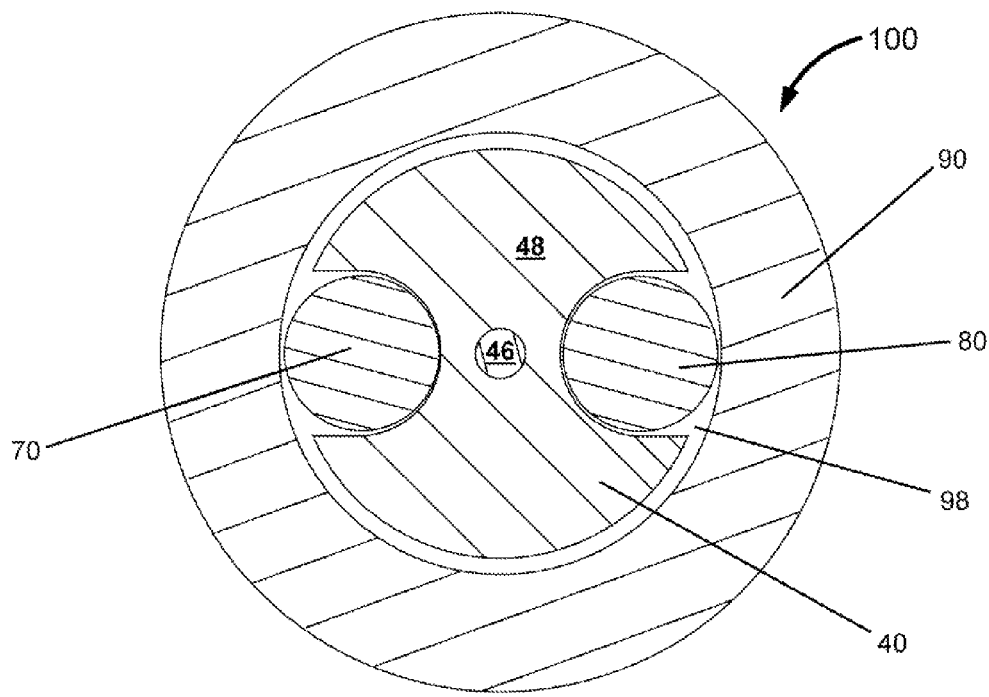
FIG. 9 shows a cross section of the preform assembly shown in FIG. 5.

FIG. 4 shows an exploded view of the loaded preform rod 40 and overcladding tube 90, prior to assembly. FIGS. 5 and 9 show, respectively, isometric and end views of the preform assembly 100 that is created by positioning the loaded preform rod 40 within the overcladding tube 90.

According to the present practice of exemplary technique 20, the overcladding tube has an inner circumferential surface 92 that fits closely around the preform rod 40 with loaded first and second stress elements 70 and 80. When an optical fiber is drawn from the preform assembly 100, the overcladding tube 90 is consolidated with the other preform components, and forms an overcladding region in the drawn fiber having a thickness corresponding to that of the overcladding tube 90.

In the presently described practice of exemplary technique 20, the overcladding tube 90 has an open end 94 and an airtight closed end 96. The closed end 96 is created by loading the overcladding tube 90 into a glassworking lathe and then heating and pulling a selected tube end to close it. The preform rod 40 and loaded first and second stress elements 70 and 80 are then placed into the overcladding tube 90 through its open end 94 to form the preform assembly 96.

As mentioned above, the first and second stress elements 70 and 80 protrude slightly outside of the outer peripheral surface 44 of the preform rod 40. The first and second stress elements 70 and 80 act as spacers, maintaining a gap 98 between the outer peripheral surface 44 of the preform rod 40 and the inner circumferential surface 92 of the overcladding tube 90.

Step 24 calls for drawing the preform assembly 100 into optical fiber.

In the presently described practice, an overclad during draw (ODD) technique is used. The preform assembly is loaded vertically into a draw tower, with the closed end 96 facing downward. A vacuum is created in the interior of the preform assembly 100 by attaching a vacuum pump to its open end 94.

As the preform assembly 100 is lowered through the hot zone of the draw tower, the preform components collapse together and consolidate. In particular, as the overcladding tube collapses around the preform rod and stress elements, the inner circumference of the overcladding tube presses against the protruding portions of the stress elements, causing each stress element to be molded into its respective groove.

Figure 10:
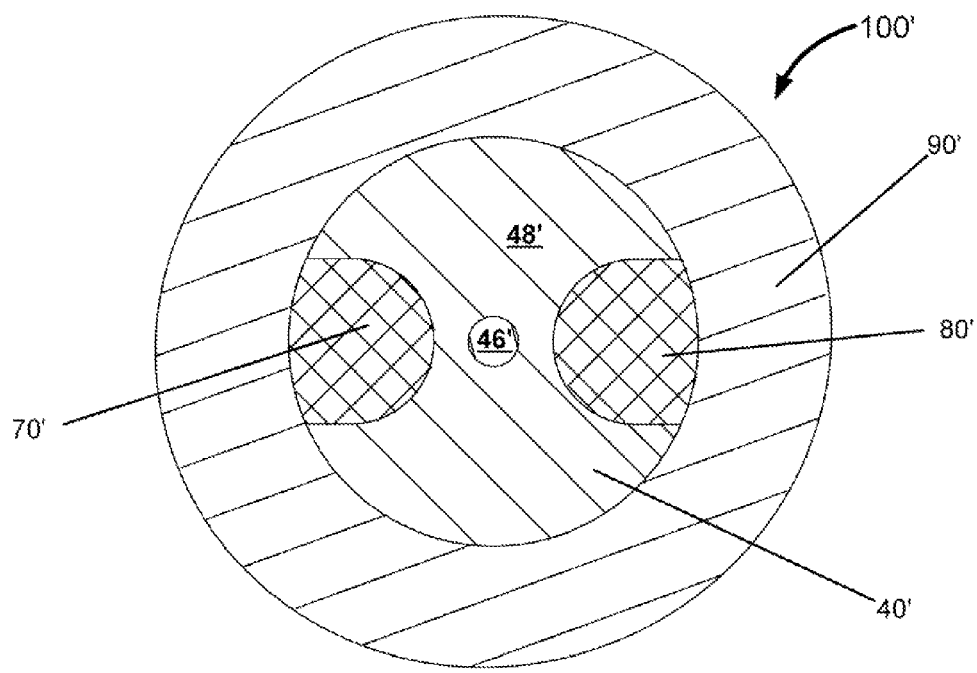
FIG. 10 shows a cross section of the preform assembly shown in FIG. 9 after consolidation in a draw tower.

FIG. 10 is a cross section diagram of the consolidated preform 100' illustrating the consolidated overcladding tube 90', preform rod 40', and stress elements 70' and 80'. Gaps in the preform assembly 100 have been closed, and stress elements 70' and 80' fill longitudinal grooves 50' and 60'. As shown in FIG. 10, the stress elements 70' and 80' no longer have a circular profile. The above-described molding process has caused a deformation of the circular profile of each stress element to conform to the shape of the stress element's respective groove.

One advantage of the above-described pressing and molding of each stress element into its respective groove is the elimination of any air lines, bubbles, or pockets around the stress elements in the collapsed preform. Further, it is believed that the deformed shape of the stress element profiles may provide additional birefringence compared with that provided by stress elements having circular profiles.

After consolidation, the preform 100 is then drawn, with an applied tension, into optical fiber. A protective coating is applied to the drawn fiber, which is then wound onto a spool.

Sample Fiber Designs

In a first sample design according to the above-described techniques, a preform rod is made using an MCVD process. It is overcladded to a diameter of 32 mm. Two opposite grooves are ground into the rod through its outer peripheral surface using a diamond wheel on a surface grinder. The dimensions of the grooves are adjusted so that the cross-sectional area of the groove is substantially equal to the cross-sectional area of the stress element.

The stress elements have a 12 mm diameter core of silica, doped with 20 mol % boron, and a 0.5 mm $SiO_2$ shell, resulting in an overall diameter of 13 mm. The length of the stress elements is 70-75 cm. The groove width is approximately 13.5 mm, and the depth is approximately 12.3 mm. Thus, after being loaded into the respective grooves, the stress elements protrude approximately 0.7 mm beyond the outer peripheral surface of the preform rod. The cross-sectional area of the stress element is equal, within tolerance, to the cross-sectional area of the groove, resulting in a homogeneous and uniform drawn fiber.

In the sample design, the overcladding tube has an inner diameter of 36 mm and an outer diameter of 53.5 mm. The overcladding tube is closed at one end by heating and pulling the tube end in a glassworking lathe. The preform core unit and the two stress elements are then slid into the overcladding tube.

The preform is then drawn into fiber using an overclad during draw (ODD) technique. During fiber draw, the tube is heated until it softens and collapses onto the preform rod, and the tube glass consolidates with the outer glass layer on the rod. A vacuum is applied to the preform during draw. In the hot zone of the draw furnace, the preform assembly collapses into a consolidated preform having an outer diameter of approximately 52 mm.

The fiber is drawn to 125 μm at a speed of approximately 11 m/sec and a tension of 100 g. A standard dual-layer acrylate coating is applied to the drawn fiber. A preform having the above dimensions is expected to potentially yield a maximum fiber length of 120 km. In one trial, 100 km was drawn in one length from the preform.

The sample fibers had a step-index core resulting in a cutoff wavelength of 1410 nm and a modefield diameter (MFD) of 10.4 μm. The measured attenuation at 1550 nm was 0.39 db/km. The birefringence was $3.5 \times 10^{-4}$, corresponding to a beat length of 4.4 mm at 1550 nm wavelength. ("Beat length" is a characteristic of optical fiber used to quantify the fiber's ability to maintain polarization. The beat length describes the length of fiber required for the polarization to rotate 360 degrees. For a given wavelength, beat length is inversely proportional to birefringence.)

In a second sample design according to the above-described techniques, a preform rod is made using an MCVD process. It is overcladded to a diameter of approximately 28.3 mm. Two opposite grooves are ground into the rod through its outer peripheral surface using a diamond wheel on a surface grinder. The dimensions of the grooves are adjusted so that the cross-sectional area of the groove is substantially equal to the cross-sectional area of the stress element.

The stress elements have a 12 mm diameter core of silica, doped with 20 mol % boron, and a 0.5 mm $SiO_2$ shell, resulting in an overall diameter of 13 mm. The length of the stress elements is 70-75 cm. The groove width is approximately 13.5 mm, and the depth is approximately 12.3 mm. Thus, after being loaded into the respective grooves, the stress elements protrude approximately 0.7 mm beyond the outer peripheral surface of the preform rod. The cross-sectional area of the stress element is equal, within tolerance, to the cross-sectional area of the groove, resulting in a homogeneous and uniform drawn fiber.

In the sample design, the overcladding tube has an inner diameter of 31 mm and an outer diameter of 40 mm. The overcladding tube is closed at one end by heating and pulling it in a glass-working lathe. The preform core unit and the two stress elements are then slid into the overcladding tube.

The preform is then drawn into fiber using an overclad during draw (ODD) technique. During fiber draw, the tube is heated until it softens and collapses onto the preform rod, and the tube glass consolidates with the outer glass layer on the rod. A vacuum is applied to the preform during draw. In the hot zone of the draw furnace, the preform assembly collapses into a consolidated preform having an outer diameter of approximately 38 mm.

The fiber is drawn to 80 μm at a speed of approximately 11 m/sec and a tension of 40 g. A standard dual-layer acrylate coating is applied to the drawn fiber. A preform having the above dimensions is expected to potentially yield a maximum fiber length of 150 km. In one trial, 130 km was drawn in one length from the preform.

The sample fibers had a step-index core resulting in a cutoff wavelength of 1470 nm and a modefield diameter (MFD) of 6.3 µm. The measured attenuation at 1550 nm was 0.70 db/km. The birefringence was $5.4 \times 10^{-4}$, corresponding to a beat length of 2.9 mm at 1550 nm wavelength. The extinction ratio was measured on a fiber which was wound onto a standard shipping spool with a tension of 20 g. The fiber had a length of 2.1 km. A value of the extinction ratio of 32.4 db/100 m was obtained. The extinction ratio was also measured on a fiber wound in a loose coil, resulting in an extinction ratio of 36 db/100 m.

CONCLUSION

The above-described technique avoids the drilling of holes. The preform can then be made significantly longer, i.e., greater than 1 meter, and the machining of the glass can be made with a standard machine shop surface grinder, equipped with a diamond wheel. It is believed that the described techniques will make it possible to manufacture PANDA-style fibers at a significantly reduced cost, while maintaining fiber specifications.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for fabricating a birefringent optical fiber, comprising:
    (a) fabricating a preform rod having a longitudinal axis, an outer peripheral surface, and a selected refractive index variation;
    (b) cutting at least one longitudinal groove into the preform rod through its outer peripheral surface;
    (c) loading a respective birefringence-inducing stress element into the at least one longitudinal groove, wherein the respective stress element has a cross sectional area that is substantially equal to that of the at least one longitudinal groove, and wherein the respective birefringence-inducing stress element and the at least one longitudinal groove are shaped, such that when the respective birefringence-inducing stress element is loaded into the at least one longitudinal groove, a portion of the stress element protrudes outside of the outer peripheral surface of the preform rod;
    (d) creating a preform assembly by positioning the loaded preform rod within an overcladding tube; and
    (e) drawing the preform assembly into optical fiber, wherein step (e) includes collapsing the overcladding tube around the preform rod and the at least one stress element loaded therein, such that an inner surface of the overcladding tube presses against the protruding portion of the at least one stress element so as to cause the stress element to be deformed and molded into the at least one longitudinal groove.

2. The method of claim 1, wherein step (d) comprises:
    closing one end of the overcladding tube; and
    sliding the core assembly into the overcladding tube.

3. The method of claim 1, wherein step (e) includes drawing the preform assembly using an overclad during draw technique.

4. The method of claim 1, wherein step (b) includes using a surface grinder to cut the at least one longitudinal groove into the preform rod.

5. The method of claim 4, wherein step (b) includes positioning the preform rod with respect to the grinder such that any bow of the preform rod lies in a plane that is parallel to that of the grinding surface.

6. The method of claim 1, wherein the preform rod includes a plurality of concentric regions, including a core region and a cladding region surrounding the core.

7. The method of claim 6, wherein the stress element is positioned within the cladding region parallel to the core region.

8. The method of claim 7, wherein the plurality of stress elements comprises a first stress rod and a second stress rod that are symmetrically disposed on respective first and second sides of the core region.

9. The method of claim 1, wherein the preform rod is fabricated using a modified chemical vapor deposition technique.

10. An optical fiber preform assembly for fabricating a birefringent optical fiber, comprising:
    a preform rod with a selected refractive index variation, wherein the preform rod includes at least one longitudinal groove cut into its outer peripheral surface, wherein the at least one longitudinal groove is shaped to closely receive a respective stress element;
    a respective birefringence-inducing stress element seated in the at least one longitudinal groove, wherein the stress element has a respective cross sectional area that is substantially equal to that of the at least ore longitudinal groove, and wherein the respective birefringence-inducing stress element and the at least one longitudinal groove are shaped, such that the stress element protrudes outside of the outer peripheral surface of the preform rod; and
    an overcladding tube surrounding the preform rod and stress element, wherein the overcladding tube, the at least one longitudinal groove, and the overcladding tube are configured to result in a collapse, during draw, of the overcladding tube around the preform rod and the at least one stress element loaded therein, such that inner surface of the overcladding tube presses against the protruding portion of the at least one stress element so as to cause the stress element to be deformed and molded into the at least one longitudinal groove.

11. The optical fiber preform assembly of claim 10, wherein the overcladding tube includes an open end and a closed end.

12. The optical fiber preform assembly of claim 10, wherein the preform rod includes a plurality of concentric regions, including a core region and a cladding region surrounding the core.

13. The optical fiber preform assembly of claim 12, wherein the stress element is positioned within the cladding region parallel to the core region.

14. The optical fiber preform assembly of claim 13, wherein the plurality of stress elements comprises a first stress rod and a second stress rod that are symmetrically disposed on respective first and second sides of the core region.

15. The optical fiber preform assembly of claim 10, wherein the preform rod is fabricated using a modified chemical vapor deposition technique.

* * * * *